US008610961B2

(12) United States Patent
Nagai

(10) Patent No.: US 8,610,961 B2
(45) Date of Patent: Dec. 17, 2013

(54) IMAGE-PROCESSING APPARATUS, IMAGE-PROCESSING METHOD AND RECORDING MEDIUM

(75) Inventor: Jun Nagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 997 days.

(21) Appl. No.: 12/176,231

(22) Filed: Jul. 18, 2008

(65) Prior Publication Data

US 2009/0027699 A1 Jan. 29, 2009

(30) Foreign Application Priority Data

Jul. 23, 2007 (JP) ................................ 2007-190607

(51) Int. Cl.
*G06K 15/02* (2006.01)
*H04N 1/60* (2006.01)

(52) U.S. Cl.
USPC ........... 358/3.26; 358/1.9; 358/1.2; 358/3.11; 358/3.12; 358/505; 347/9

(58) Field of Classification Search
USPC ...................... 358/1.2, 1.13, 3.01, 448; 347/9
See application file for complete search history.

(56) References Cited

U.S. PATENT DOCUMENTS

| | | | | | |
|---|---|---|---|---|---|
| 5,138,670 | A * | 8/1992 | Nakajima et al. | ............. | 382/282 |
| 5,831,642 | A * | 11/1998 | Matsubara et al. | ............... | 347/9 |
| 7,292,356 | B2 * | 11/2007 | Otokita | ........................ | 358/1.13 |
| 2006/0181563 | A1 * | 8/2006 | Niekawa | ......................... | 347/19 |
| 2008/0019561 | A1 * | 1/2008 | Tani et al. | ..................... | 382/100 |

FOREIGN PATENT DOCUMENTS

| | | |
|---|---|---|
| JP | 2000-175029 A | 6/2000 |
| JP | 2001-080112 A | 3/2001 |
| JP | 2005-070432 A | 3/2005 |

* cited by examiner

*Primary Examiner* — Steven Kau
*Assistant Examiner* — Quang N Vo
(74) *Attorney, Agent, or Firm* — Canon USA Inc. IP Division

(57) ABSTRACT

A comparison is made between image data and a predetermined image pattern and data on a specific area is extracted from the image data based on the comparison result, and dot data is added at a position away from an end of the specific area subjected to the signal-level reduction by as much as a predetermined distance.

11 Claims, 13 Drawing Sheets

IMAGE-PROCESSING APPARATUS, IMAGE-PROCESSING METHOD AND RECORDING MEDIUM

BACKGROUND OF THE INVENTION

1. Field of the Invention

The present invention relates to an image-processing apparatus, an image-processing method and a recording medium, and relates to, for example, image processing performed to control the amount of applied coloring materials.

2. Description of the Related Art

There have been increasing occasions where data which was generated by a personal computer (PC) or the like was printed through an image-processing apparatus having a printing function. The image-processing apparatus including a laser-beam printer or the like receives data on a command relating to printing, data on encoded characters, and drawing information that are transmitted from a host computer including the PC, a work station, etc. The image-processing apparatus converts the received command data into pixel-information items through a rendering unit and forms an image based on image signals generated based on the pixel-information items.

More specifically, first, a photosensitive drum is uniformly charged by using a charge roller or the like, and an electrostatic-latent image is formed on the photosensitive drum by using the image signal generated based on the above-described pixel-information items, for example, by exposing the photosensitive drum to laser light emitted from a laser scanner. The above-described formed electrostatic-latent image is developed by a developing device and a developed toner image is transferred to a transfer material through a transfer roller or the like. Then, the toner image is permanently fixed on the transfer material through a fixing device so that the image is printed.

On the other hand, when the amount of toner adhered during the development is large, that is to say, when the amount of applied toner is large, the toner is not thoroughly fixed but scattered. Further, the toner comes off a part where the dot density is high. The frequency of occurrence of the above-described problems varies with environmental circumstances surrounding the image-processing apparatus, the environmental circumstances relating to humidity, temperature, etc. Here, there are many types of mediums used for printing, such as paper. However, problems similar to the above-described problems often occur depending on the types of mediums.

Further, when a line image 102 is printed in a main-scanning direction, toner is scattered to the rear of the line image 102 in a sub-scanning direction so that the image is disturbed, the line image 102 being recorded onto a transfer material 101, as shown in FIG. 1. FIG. 2 shows the reason for the above-described problem. Namely, since a sudden rise in temperature occurs when the transfer material 101 passes through a fixing device 201, water vapors 202 are generated from the moisture content of the transfer material 101. At that time, the water vapors 202 of the transfer material 101 on which a large amount of toner 203 is applied cannot escape so that the toner 203 is blown off by the water vapors 202 to the rear in a conveying direction. From now on, the above-described phenomenon where toner is scattered in the sub-scanning direction toward the rear of a linear image extending in the main-scanning direction so that the line image is disturbed is referred to as a tailing phenomenon.

Methods of reducing the amount of adhered toner have been used, so as to reduce the above-described tailing phenomenon. More specifically, in general, a method of reducing the development ability, namely, a method of reducing the direct-current component of a developing bias and/or a method of thinning out dot data of image data for which image formation is performed has been used (refer to Japanese Patent Laid-Open No. 2000-175029 and Japanese Patent Laid-Open No. 2001-80112, for example). When the development ability is reduced by changing the developing bias, the adhered-toner amount is decreased so that the problems including toner scattered around characters, toner tailing, etc. are reduced. However, since the amount of toner applied on the edge part of image data is significantly decreased, the image quality is decreased. Further, the density stability is decreased when being put through an endurance test.

Further, reducing the dot data by performing the thinning-out processing for the image data has been perceived as processing decreasing the image quality. Particularly, when the thinning-out ratio is increased until the tailing phenomenon disappears completely, image deterioration occurs, as a decreased line width, a reduced density, omission of image data, etc. depending on the degree of the tailing phenomenon, even though the degree of the tailing phenomenon varies with the environmental circumstances and the medium types.

Japanese Patent Laid-Open No. 2005-70432 discloses the technology of performing the thinning-out processing, so as to reduce the tailing phenomenon while decreasing the image deterioration. According to Japanese Patent Laid-Open No. 2005-70432, a predetermined image pattern is extracted, the thinning-out processing is performed for the area of the extracted image pattern, and line data is added to the upper-most part and/or the lower-most part of the extracted image pattern. According to Japanese Patent Laid-Open No. 2005-70432, image data is added, as an attempt to prevent image deterioration including a reduced line width, a reduced density, etc.

According to the above-described known methods, however, as the laser-light amount, the manner in which a drum functions, using circumstances, etc. vary with image-processing apparatuses, image-forming conditions vary with the image-processing apparatuses. Therefore, when the line data is added to the image data, the most appropriate number of lines for addition varies with the image-processing apparatuses, so that in reality it is difficult to perform control relating to determination of the amount of data to be thinned out and the number of lines for addition.

Further, when data on images such as three or four line images is added to the image data, so as to achieve the density conservation, the image data is thickened, which makes it difficult to correctly reproduce an original image.

SUMMARY OF THE INVENTION

Accordingly, the present invention is provided to perform thinning-out processing for target image data and add insignificant dot data in an area which is not adjacent to the target image data during processing performed to control the amount of applied coloring materials, so as to perform the applied-coloring-material-amount control preventing the image deterioration.

An image-processing apparatus according to an aspect of the present invention includes an extraction unit configured to extract data on a specific area from image data based on a result of a comparison made between the image data and a predetermined image pattern, and an addition unit configured to add dot data at a position away from an end of the specific area subjected to thinning-out processing by as much as a predetermined distance.

The present invention allows for effectively reduce the tailing phenomenon without decreasing the image quality without increasing the thinning-out ratio excessively during applied-coloring-material-control processing performed to reduce the amount of applied coloring materials.

The present invention has been achieved to present new functions. Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described with reference to the attached drawings. In each of the embodiments described, the present invention is used for a laser-beam printer. However, the present invention can be used without being limited to the described embodiments. Namely, the present invention can be used for an electrophotographic image-processing apparatus including an arbitrary printer, a facsimile, etc. without leaving the main idea thereof.

Figure 1:
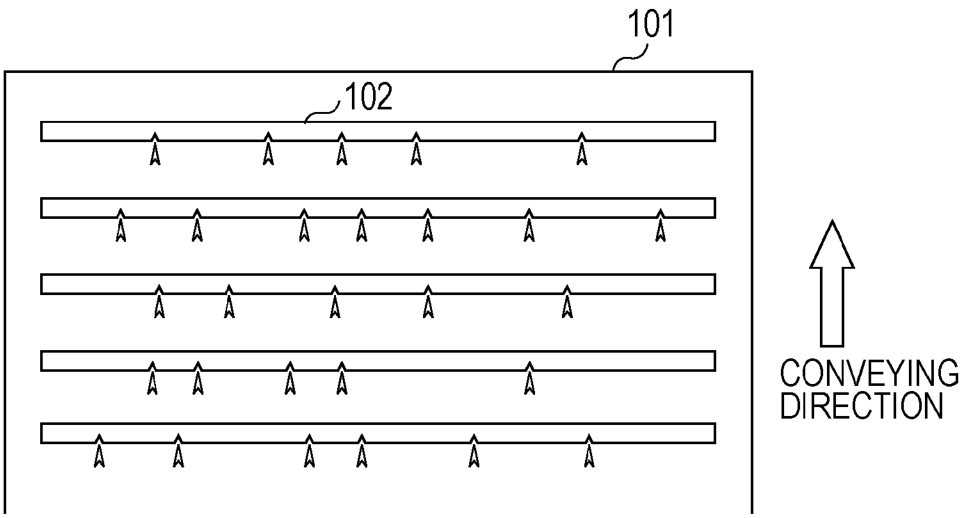
FIG. 1 shows the tailing phenomenon.
Figure 2:
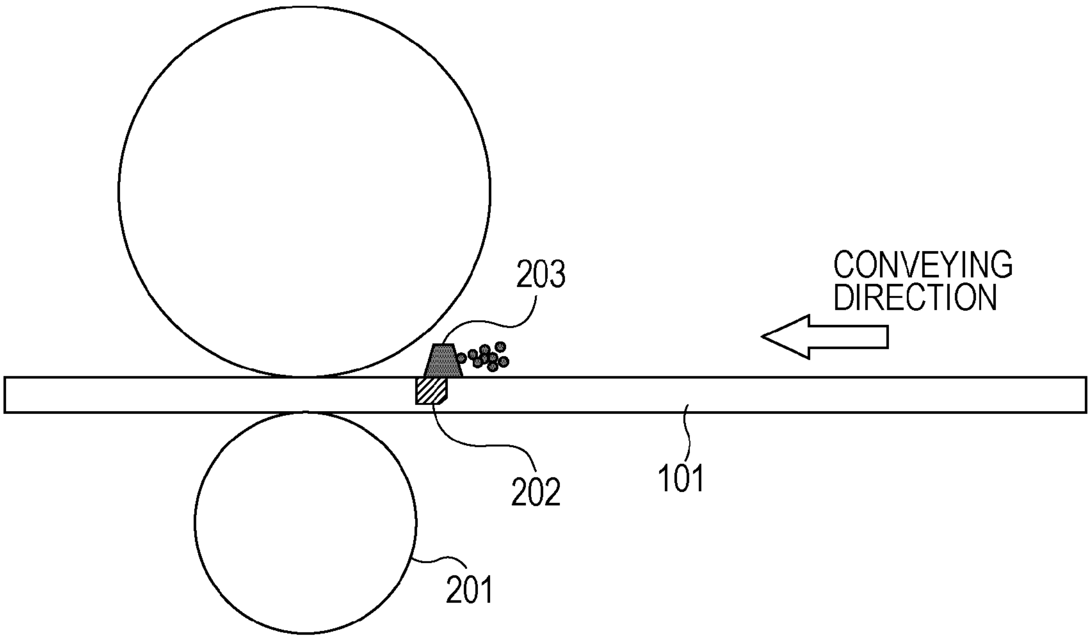
FIG. 2 shows the mechanism of occurrence of the tailing phenomenon.
Figure 3:
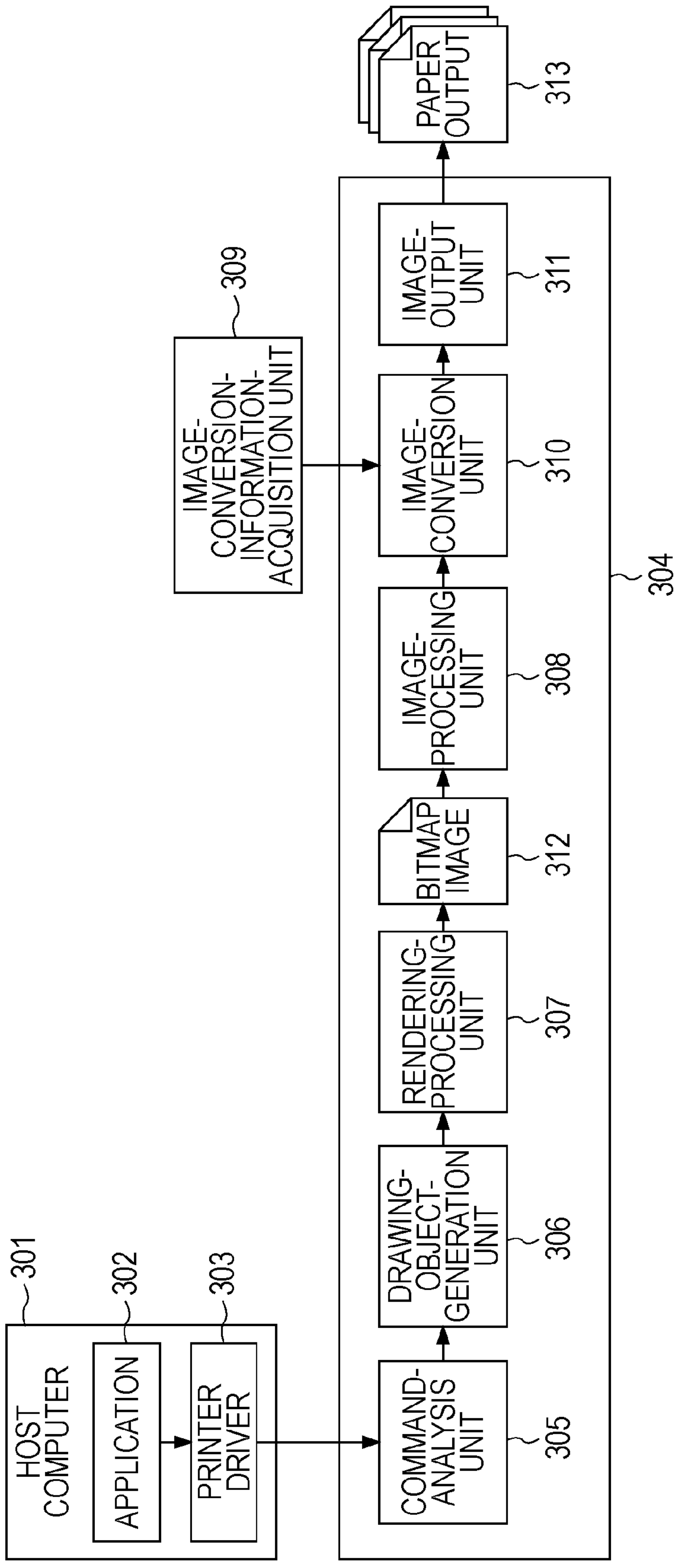
FIG. 3 is a block diagram showing an example configuration of an image-processing apparatus according to an exemplary embodiment of the present invention.

An exemplary embodiment of the present invention will be described with reference to FIG. 3. FIG. 3 is a block diagram showing the system configuration of an image-processing apparatus according to the exemplary embodiment. The above-described image-processing apparatus is configured to convert data on a drawing command transmitted from a host computer into image data and print the image data on a sheet of paper.

The use of applications 302 operating on a host computer 301 allows for generating a page-layout document, a word-processor document, a graphic document, etc. Data on a digital document generated by using the above-described applications 302 is transmitted to a printer driver 303, and a drawing command is generated based on the transmitted digital-document data. The above-described drawing command is generated by using a printer description language that is referred to as a page description language (PDL) and that is used to generate page-image data. The drawing command usually includes a drawing instruction to generate data on characters, graphics, images, etc.

The above-described generated drawing command is transmitted to an image-processing apparatus 304 connected to the host computer 301 via a network or the like. The image-processing apparatus 304 includes a command-analysis unit 305, a drawing-object-generation unit 306, a rendering-processing unit 307, an image-processing unit 308, an image-conversion unit 310, and an image-output unit 311.

First, the command-analysis unit 305 analyzes data on the drawing command transferred from the host computer 301. The drawing-object-generation unit 306 generates a drawing object that can be processed by the rendering-processing unit 307 based on the analyzed data. The drawing object generated by the drawing-object-generation unit 306 is subjected to rendering processing by the rendering-processing unit 307 so that a bitmap image 312 is generated.

The bitmap image 312 generated through the rendering processing is subjected to image processing by the image-processing unit 308, where the image processing includes color-conversion processing, pseudo-halftone processing, etc. Then, the bitmap image 312 is converted into an image format that can be output to the image-output unit 311.

Image data input to the image-output unit 311 corresponds to coloring materials of four colors including cyan (C), magenta (M), yellow (Y), and black (K). When data on the bitmap image 312 generated by the rendering-processing unit 307 is RGB-color-space-image data, the following processing is performed. Namely, the image-processing unit 308 converts the bitmap image 312, which is the RGB-color-space-image data, into CMYK-color-space-image data by using a lookup table or the like. Usually, the image-output unit 311 can only output image data with a low gradation including a 2-step gradation, a four-step gradation, a 16-step gradation, etc. Therefore, the image-processing unit 308 performs the pseudo-halftone processing so that the image-output unit 311, which can output low-gradation image data only, can achieve halftone expression with stability.

Further, in the image-processing unit 308, processing such as smoothing is often performed for an edge part or the like, so as to obtain an appropriate image.

The image-conversion unit 310 extracts data on an image area where thinning-out processing is performed for image data input to the image-conversion unit 310, and performs the thinning-out processing for the extracted image-area data according to thinning-out-processing-control information transmitted from the image-conversion-information-acquisition unit 309. Further, the image-conversion unit 310 adds a dot-information item to at least one of the front end and the rear end of the image data subjected to the thinning-out processing based on the additional-dot information which is also acquired by the image-conversion-information-acquisition unit 309.

The image-conversion unit 310 will be described in detail below. The image-output unit 311 receives and outputs image data generated in a predetermined image format so that the drawing-command data transmitted from the host computer is printed on a sheet of paper, as image data.

Here, conditions for the occurrence of the tailing phenomenon vary with image-forming apparatuses. However, in an image with a dot density of 600 dots per inch (dpi), the tailing-phenomenon occurrence particularly increases when the width of a linear image extending in the main-scanning direction corresponds to four to eight dots (150 to 300 μm), the width being defined along the sub-scanning direction. Further, the reason why the tailing phenomenon is reduced through the thinning-out processing is considered that the height of toner applied on a recording material can be reduced and the top portion of the applied toner can be reduced through thinning out image data, where the top portion of the applied toner causes the tailing phenomenon to occur.

Figure 4:
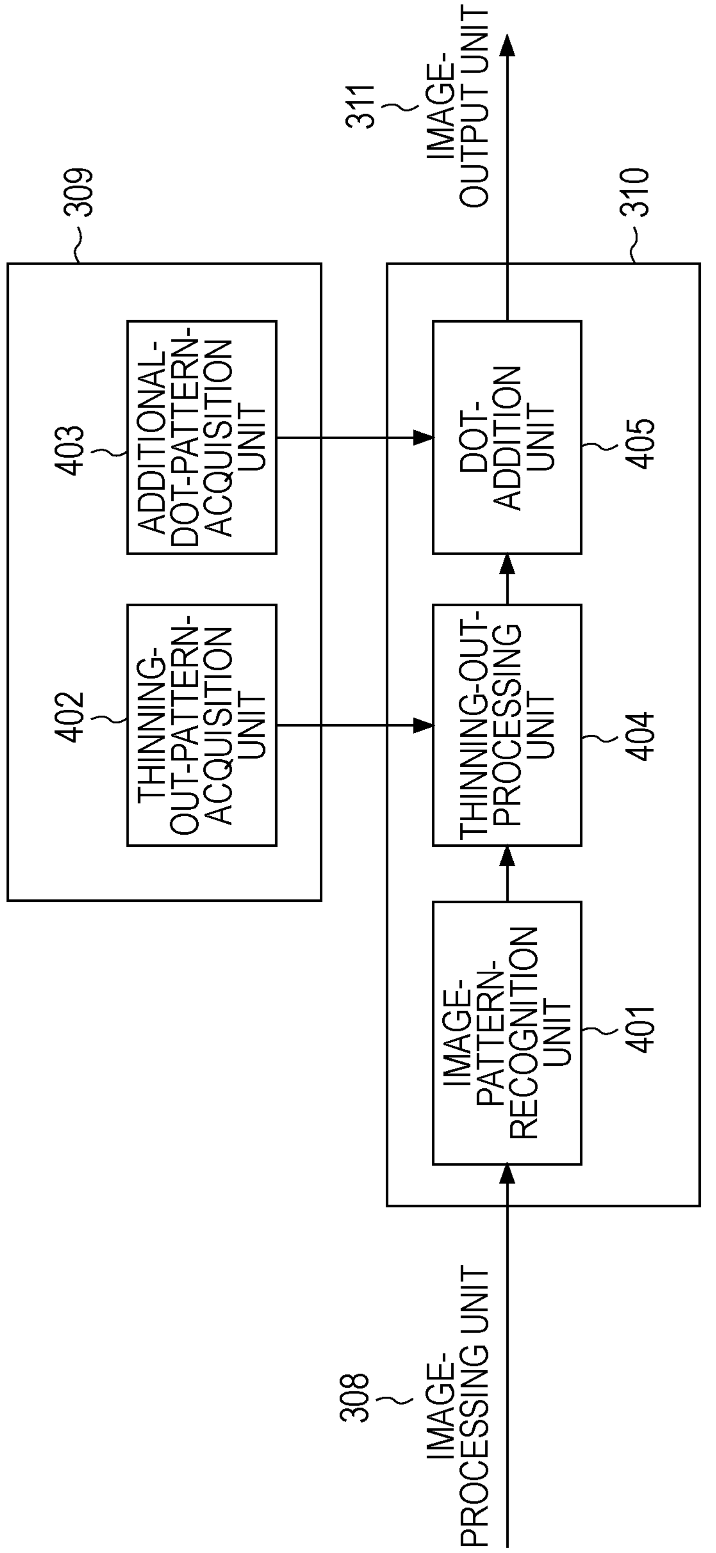
FIG. 4 is a block diagram showing details on an image-conversion unit of the exemplary embodiment.

FIG. 4 is a block diagram showing details on the image-conversion unit 310.

An image-pattern-recognition unit 401 compares image data input thereto to predetermined image pattern data and extracts data on an image area where the thinning-out processing is performed from the input image data based on the comparison result.

As described above, the tailing phenomenon easily occurs in the linear image extending in the main-scanning direction perpendicular to a direction in which a transfer material is conveyed, the transfer material having a predetermined line width defined along the sub-scanning direction parallel to the direction in which the transfer material is conveyed (the four-to-eight dot width in the image with the dot density of 600 dpi in the above-described embodiment). Therefore, in the image-pattern-recognition unit 401, pattern-matching processing is performed by comparing the above-described linear image to an image pattern from which data on a line image extending in the main-scanning direction can be extracted, where the line image has a predetermined width defined along the sub-scanning direction. Since many technologies relating to the pattern-matching processing have been available, any method can be used to recognize the image patterns according to any of embodiments of the present invention.

The image-conversion-information-acquisition unit 309 includes a thinning-out-pattern-acquisition unit 402 configured to acquire control information used to perform the thinning-out processing and an additional-dot-pattern-acquisition unit 403 configured to acquire control information used to perform dot-addition processing.

Figure 5:
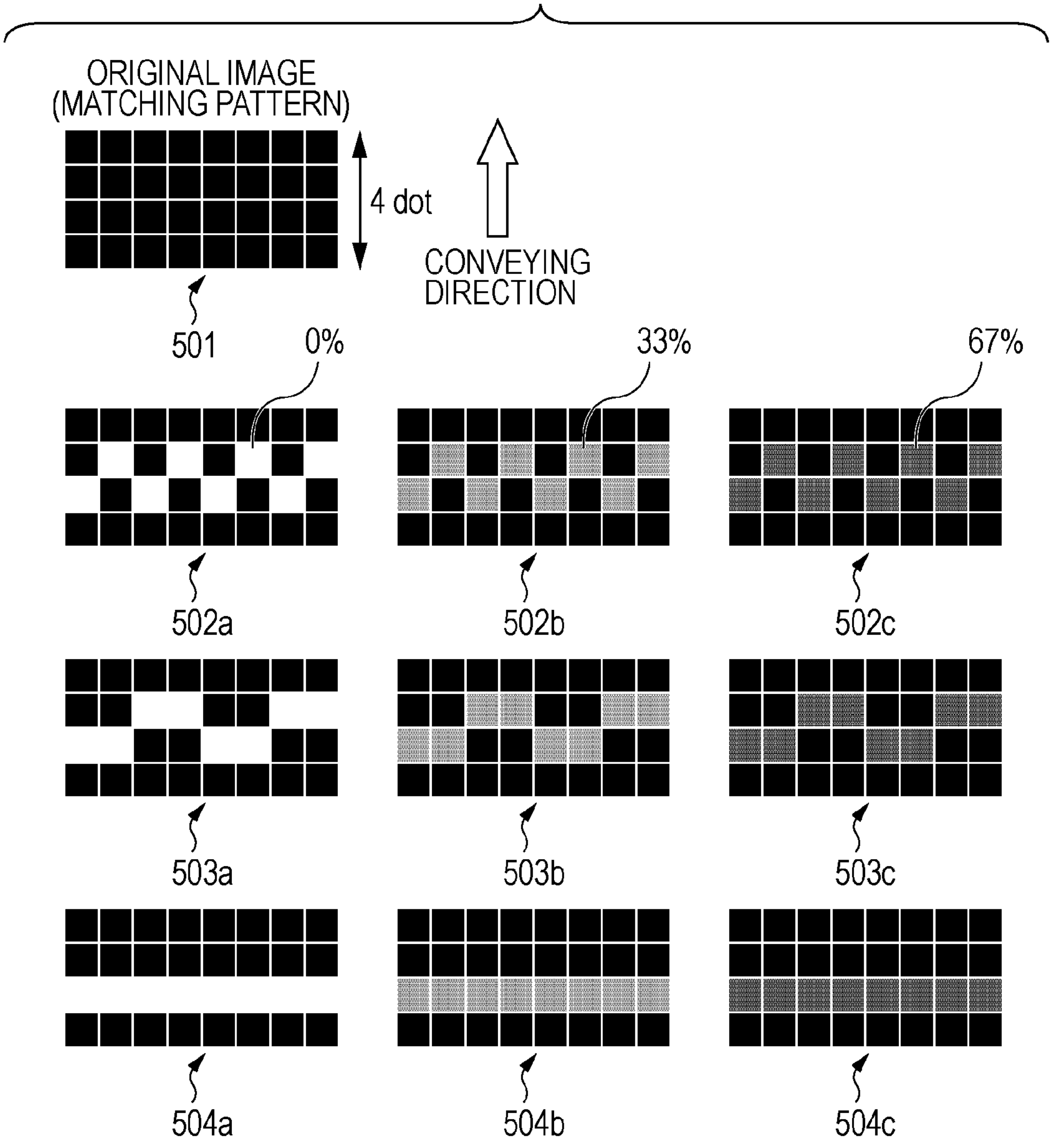
FIG. 5 shows example thinning-out patterns used in the exemplary embodiment.

FIG. 5 shows example thinning-out patterns used for image data recognized as data on a line image having the four-dot width. A thinning-out pattern 501 is data on an original image that is not yet converted, and an image area that has the four-dot width defined along the sub-scanning direction and that is continuous in the main-scanning direction. The image area is, for example, a line. The above-described image area is equivalent to a matching pattern used to extract data on an image area where the thinning-out processing is performed.

Each of thinning-out patterns 502*a*, 502*b*, 502*c*, 503*a*, 503*b*, 503*c*, 504*a*, 504*b*, and 504*c* is used by the thinning-out-processing unit 404, so as to perform the thinning-out processing. More specifically, the thinning-out processing is performed by the thinning-out-processing unit 404 replacing the thinning-out pattern with the image data extracted by the image-pattern-recognition unit 401. That is to say, the thinning-out-processing unit 404 reduces the signal level at a predetermined ratio for pixels provided in the image area on which data is extracted by the image-pattern-recognition unit 401. During the thinning-out processing, original image data is stored in dark parts of each of the thinning-out patterns 502*a* to 504*c*. On the other hand, the original image data is deleted in blank parts of each of the thinning-out patterns 502*a* to 504*c*.

Further, during the thinning-out processing, the pixels may not be deleted at all and the signal level of a single dot may be made variable so that the signal level fluctuates between 0% and 100%. The signal level of a single dot may be changed according to, for example, a pulse-width-modulation (PWM) method provided to change the laser-irradiation time (the exposing-light quantity) within a single dot. The thinning-out patterns 502*a* to 504*c* are used, for example, when the image-output unit 311 can output data on an image with the four-step gradation. Namely, the signal level of the single dot becomes 0%, 33%, 67%, and 100% that correspond to the four-step gradation.

The signal level used to achieve the thinning-out processing is 0% in each of the thinning-out patterns 502*a*, 503*a*, and 504*a*. Further, the signal level used to achieve the thinning-out processing is 33% in each of the thinning-out patterns 502*b*, 503*b*, and 504*b*. Still further, the signal level used to achieve the thinning-out processing is 67% in each of the thinning-out patterns 502*c*, 503*c*, and 504*c*.

Although the above-described nine thinning-out patterns are provided for the line image having the four-dot width in the above-described embodiment, any number of thinning-out patterns may be provided according to another embodiment of the present invention. Further, the intermediate signal level is determined to be 33% and 67%, for example, for an output device configured to output data on an image with the four-step gradation so that each of the four steps is uniformly expressed. Therefore, in another embodiment of the present invention, the signal level may be any of from 0% to 100% where feasible, and image data with any gradation may be output.

The thinning-out pattern may be acquired according to any method including the following methods. Pattern data is registered with a storage device such as a read-only memory (ROM) provided in the image-processing apparatus and the thinning-out-pattern-acquisition unit 402 acquires the pattern data when the thinning-out processing should be performed. When data on several thinning-out patterns is registered with the storage device and any of the thinning-out patterns is selected, an operator may select any of the thinning-out patterns via a user-interface (UI) unit (not shown), or the most appropriate pattern may be selected via a sensor or the like configured to perceive the state of the image-processing apparatus.

Figure 6:
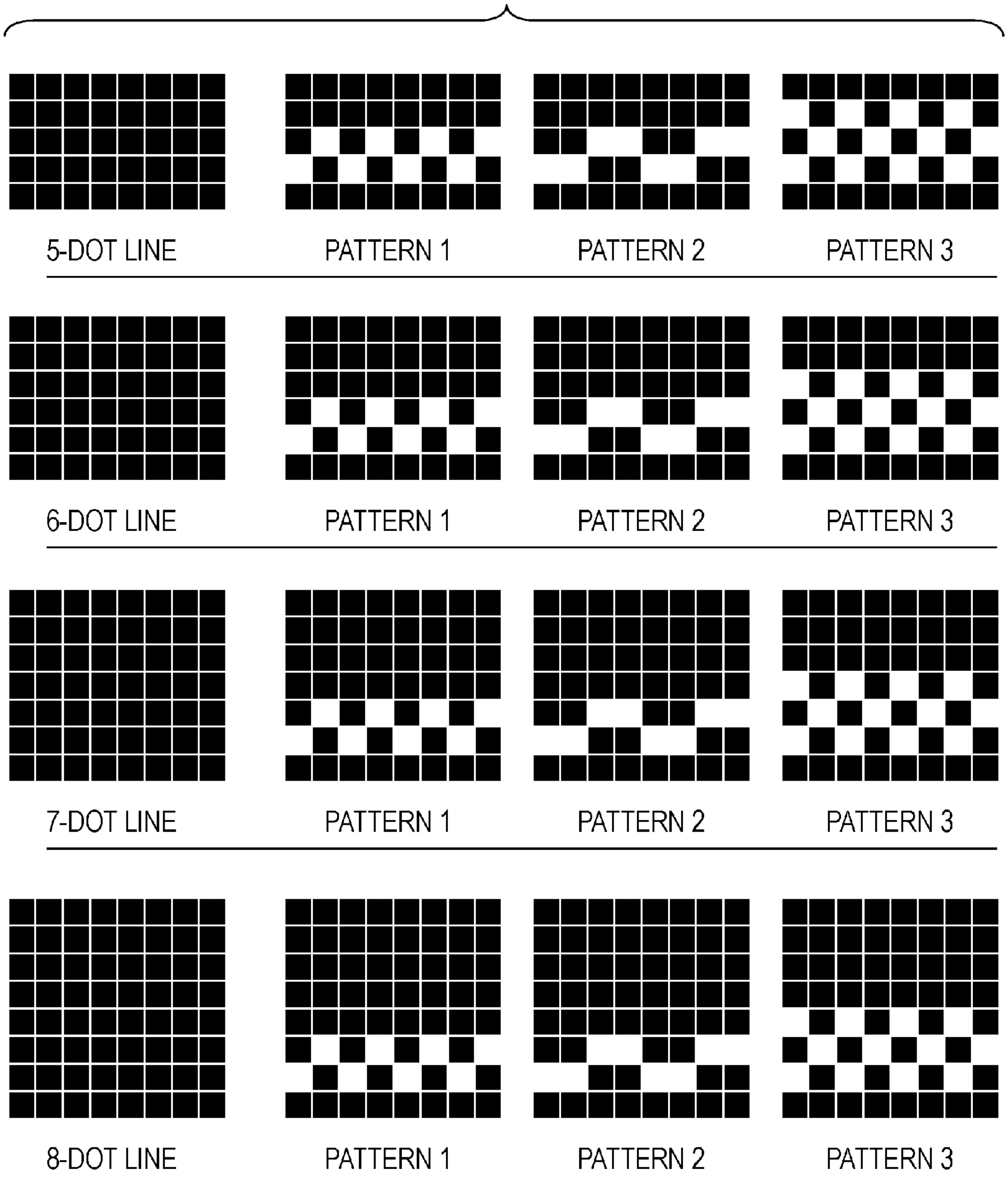
FIG. 6 shows other example thinning-out patterns used in the exemplary embodiment.

Further, according to the first embodiment, FIG. 5 shows the thinning-out patterns 502*a* to 504*c* provided for the line image with the four-dot width. FIG. 6 shows example thinning-out patterns used when the line image is recognized as a line image with a five to eight dot width. In FIG. 6, each of signal levels used to achieve the thinning-out processing is only 0%, for example. However, the intermediate signal level may be used.

According to known methods, the amount of the applied toner is decreased by thinning out the image data and the tailing phenomenon is reduced by reducing the height of the applied toner. However, under some conditions determined by an environment or the like, it is difficult to eliminate the tailing phenomenon entirely by performing the thinning-out processing in a predetermined degree. In that case, the thinning-out rate should be increased to entirely eliminate the tailing phenomenon, which causes missing and/or deterioration of the image data. Here, an edge effect is considered as the reason why the tailing phenomenon is not reduced even though the thinning-out processing is performed and the data amount is reduced.

The edge effect is a phenomenon in which a strong electric field occurs not in the center part but in the boundary part of an electrostatic latent image formed on an electrophotography photosensitive body (an edge-electric field). Being affected by the electric field, each of the amount of adhered toner and the density increases in the boundary part of the electrostatic latent image. On the contrary, the density of the center part of the electrostatic latent image decreases.

Figures 7A, 7B, 7C:
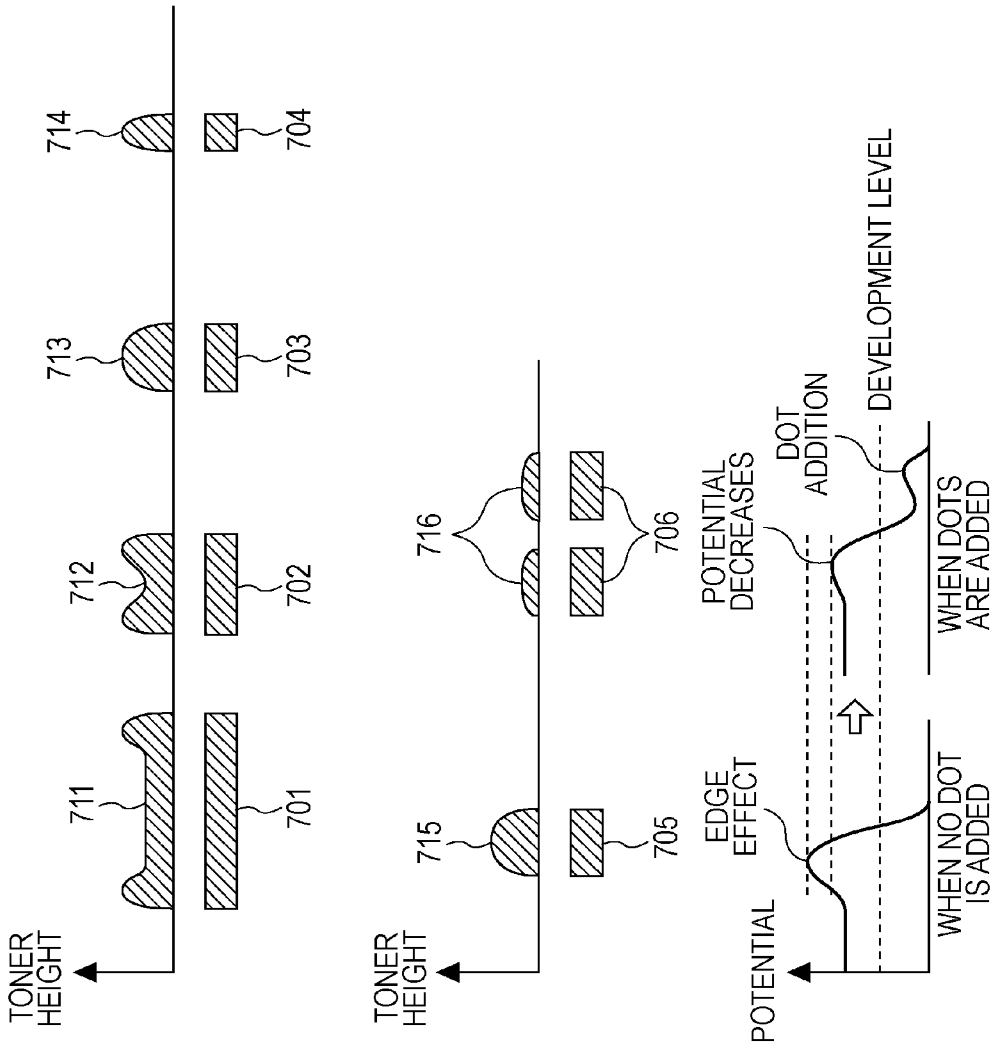
FIG. 7A illustrates an edge effect.
FIG. 7B further illustrates the edge effect.
FIG. 7C further illustrates the edge effect.

Details on the edge effect will be described with reference to FIGS. 7A, 7B, and 7C. In FIG. 7A, the horizontal axis indicates space, distances, etc. and the vertical axis indicates the heights of the adhered toner. Further, the latent-image areas provided on the photosensitive drum, the latent-image areas corresponding to the adhered-toner heights, are also indicated in the lower part of FIG. 7A.

In a relatively large latent-image area 701 shown in FIG. 7A, an adhered-toner height 711 tends to increase in its peripheral part rather than in its center part. The same tendency is shown in a latent-image area 702 having a certain width, as indicated by an adhered-toner height 712. Further, in latent-image areas 703 and 704 where dot areas decrease, the potential of each of latent images of the latent-image areas 703 and 704 tends to decrease. However, being affected by the edge effect, adhered toner heights 713 and 714 become almost the same as the adhered toner heights 711 and 712 corresponding to the large latent-image areas 701 and 702. FIG. 7B indicates that the edge effect is suppressed by the density of the dot area. A latent-image area 705 is generated when a narrow dot area (latent-image area) is generated in isolation. As is the case with the latent-image areas 703 and 704, an adhered-toner height 715 relatively increases due to the edge effect. On the other hand, when a dot area (latent-image area) is closer to another dot area than the latent-image area 705 is so that the dot areas are densely provided, as is the case with latent-image areas 706, the edge effect is suppressed so that the height 716 of toner adhered to each of the dot areas decreases. More specifically, when a dot area is provided in isolation, as is the case with the latent-image area 705, electric flux lines are concentrated so that the electric-field strength increases and the toner is easily developed at the part corresponding to the increased electric-field strength. On the contrary, in the case where the latent-image areas 706, which are the densely provided dot areas, are provided, the electric flux lines are not concentrated and the toner amount decreases.

According to known methods of reducing the tailing phenomenon, dots of image data are thinned out, as an attempt to decrease the applied toner amount. However, the applied toner amount is not sufficiently decreased in the part corresponding to the image edge due to the edge effect, so that the tailing phenomenon is often not reduced by thinning out the image data.

Here, the edge effect becomes significant when the dot density is low. When the dot density is high, that is to say, when many dots are provided around a predetermined dot, an excess supply of toner is reduced and the edge effect is decreased. According to the present embodiment, dot data which is so insignificant that no dot image is formed therefor is added to at least one of the front end and the rear end that are not adjacent to image data subjected to the thinning-out processing. Subsequently, the dot density of the image-edge part is increased (the number of dots provided in isolation is decreased) so that the edge effect is relaxed and the tailing phenomenon is effectively reduced without increasing the thinning-out ratio excessively.

FIG. 7C shows how the edge effect is relaxed through addition of the insignificant dot data. When no dot data is added, the electric flux lines are concentrated so that the electric-field strength increases and the edge effect occurs, as described above. On the other hand, the dot density is increased through the addition of the dot data so that the electric-field strength is decreased and the edge effect is relaxed. Here, since the level of the added dot data is insignificant and lower than the development level of a developing device (not shown), no dot image is formed based on the added dot data.

Next, the additional-dot-pattern-acquisition unit 403 acquires data on the pattern of dots added to the image data, and a dot-addition unit 405 adds dot data to the image data based on the acquired dot-pattern data.

Figure 8:
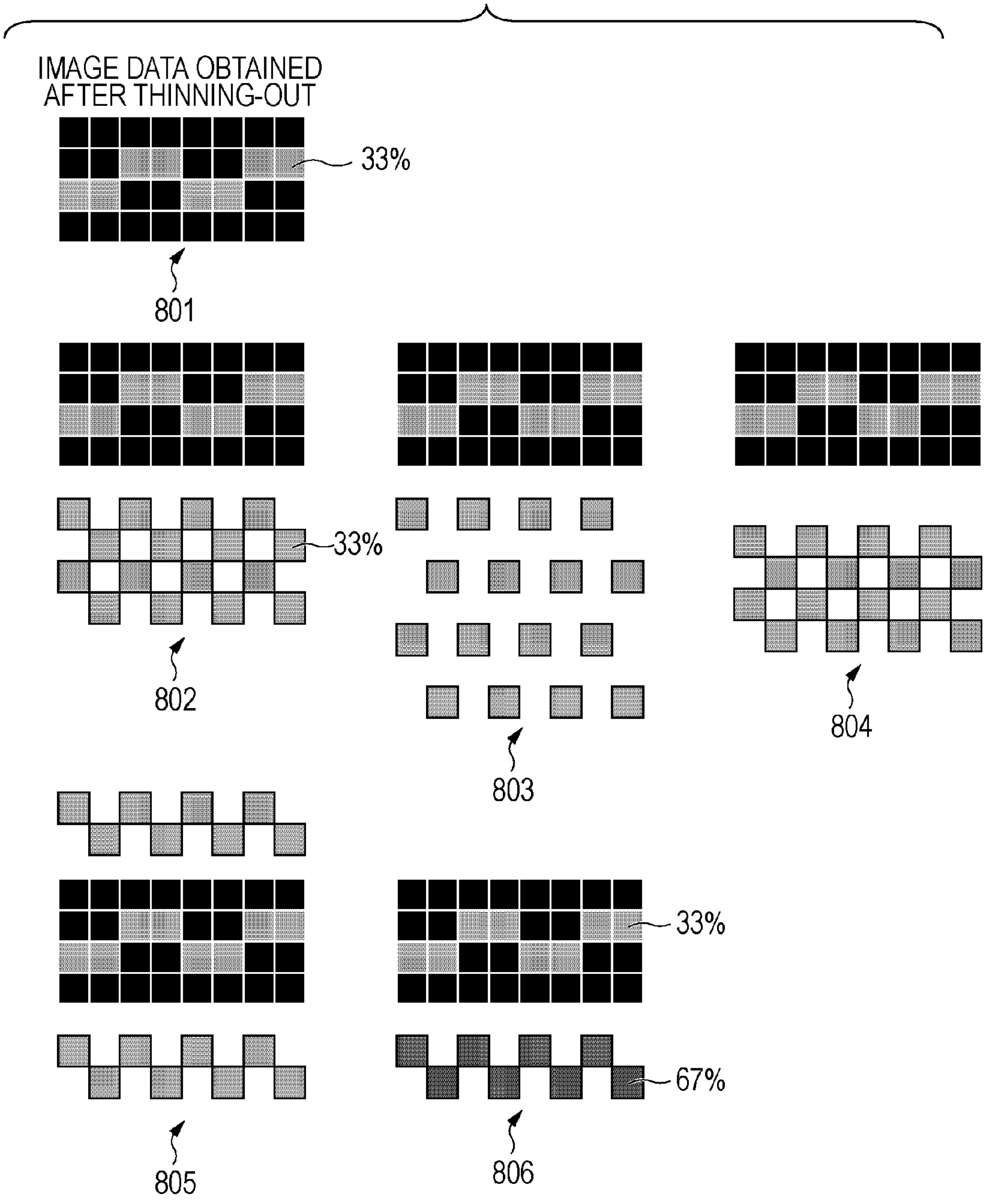
FIG. 8 shows example additional-dot patterns used in the exemplary embodiment.

FIG. 8 shows patterns subjected to the thinning-out processing. Further, dot data is added to the patterns shown in FIG. 8. The thinning-out pattern **503*b* shown in FIG. 5** is used, for example, so as to perform the thinning-out processing. For adding the dot data, it is preferable that no image is formed based on the added dot data. If an image is formed based on the added dot data, thickening, fogging, etc. happen to input image data, which makes it difficult to reproduce the input image data correctly. Therefore, additional dot data is added at a location a predetermined distance from the end of original image data subjected to the thinning-out processing so that the additional dot data is not adjacent to the original image data. Further, the dot data should be added in isolation, so as not to be adjacent to other dot data, as much as possible. Here, the predetermined distance denotes the position away from the end of the original image data by as much as a single dot, and when the dot data is added at the position, the tailing phenomenon can be effectively reduced. Further, when the dot data is added to a position away from the end of the original image data by as much as three dots, the tailing phenomenon can be effectively reduced.

FIG. 8 shows image data 801 that had been subjected to the thinning-out processing. Here, each of gray pixel parts subjected to the thinning-out processing shows 33 percent of signals.

According to the present embodiment, the total amount of signal levels of additional dot data is made to be equivalent to that of data thinned out from data on a real image so that conservation of the density is achieved in a small area. That is to say, when a pixel with a 100%-signal level is replaced with a pixel with a 33%-signal level for a single dot during the thinning-out processing, 67%-image data should be added in total, as dot data. Image data 802 is obtained by adding pixels with the 33%-signal level to the rear end of the image data by as much as two dots. It is preferable that no image is formed based on the above-described additional dots. Further, the additional dots are added, so as not to be adjacent to one another as much as possible. The pattern of additional dots may be determined without being limited to the above-described embodiment. Namely, the additional-dot pattern may be determined so that a latent image is formed with difficulty based on the dot data, as is the case with image data 803. Further, when the additional-dot pattern is adjacent to the original image data, there is a high possibility that an image is formed based on the additional-dot pattern. Therefore, the additional-dot pattern should not be adjacent to the original image data and the distance between the additional-dot pattern and the original image data may be long, as is the case with image data 804. According to the image data 802, the image data 803, and the image data 804, the dot data is added to the rear end of the image data, for example. However, the dot data may be added to the front end of the image data, or both the front end and the rear end of the image data, as indicated by image data 805.

Further, if an output device configured to form no dot image based on data on a single dot even though the signal level corresponding to the single dot is 67% is used, a pattern indicated by image data 806 can be used. According to the image data 806, the signal level corresponding to the single level is 67%. Therefore, considering the density conservation, the number of additional dots may be smaller than that of additional dots corresponding to the 33%-signal level.

Thus, the example additional-dot patterns have been described in the present embodiment. However, without being limited to those example patterns, any pattern with a signal level for which no image is formed may be used, as the additional-dot pattern.

As for the method of acquiring the additional-dot pattern, it is preferable that the additional-dot pattern is selected in association with the thinning-out pattern, in the present embodiment, so as to retain the density information. Namely, data on the thinning-out pattern is stored in advance in the storage device such as the ROM provided in the image-processing apparatus, and the thinning-out-pattern data is acquired through selection made by the operator, an instruction issued by the sensor, etc. Then, data on the additional-dot pattern is registered with the storage device in advance in association the thinning-out-pattern data and the additional-dot pattern is selected according to the thinning-out pattern. A combination of the thinning-out pattern and the additional-dot pattern is selected so that data on a control value of the thinning-out processing and that of the dot-addition processing are input to the image-processing apparatus. Thus, according to the first embodiment, dot data which is so insignificant that no dot image is formed therefor is added to at least one of a front end and a rear end that are not adjacent to image data subjected to the thinning-out processing. Subsequently, the dot density of the image-edge part is increased so that the edge effect is decreased and the tailing phenomenon is effectively reduced without increasing the thinning-out ratio excessively.

In the above-described embodiment, the relationship between the thinning-out pattern and the additional-dot pattern is uniquely determined, and the additional-dot pattern is determined at the same time as when the thinning-out pattern is selected. However, there is a possibility that a dot image is formed due to the additional-dot pattern and the degree of the tailing phenomenon varies depending on the environmental conditions of the output device.

Therefore, in another embodiment of the present invention, a method of providing a way for separately setting the thinning-out pattern and the additional-dot pattern is proposed. The system configuration of an image-processing apparatus of the present embodiment is the same as that shown in each of FIGS. 3 and 4 that are described in the embodiment described above. Therefore, detailed descriptions of the system configuration are not repeated.

Figure 9:
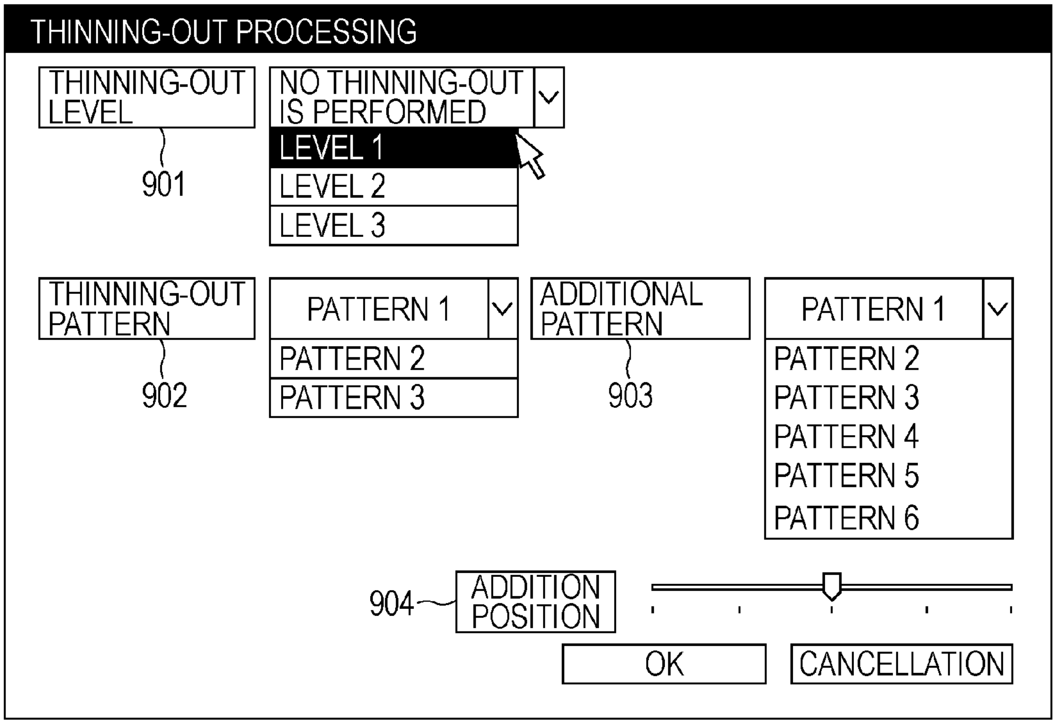
FIG. 9 shows example user interfaces (UIs) of an image-conversion-information-acquisition unit according to an exemplary embodiment of the present invention.

FIG. 9 shows an example UI of the image-conversion-information-acquisition unit 309 used in the present embodiment. A pull-down menu 901 is provided to determine whether or not the thinning-out processing should be performed. If it is determined that the thinning-out processing should be performed, the pull-down menu 901 allows for selecting a thinning-out level indicating the degree of the thinning-out processing.

Figure 10A:
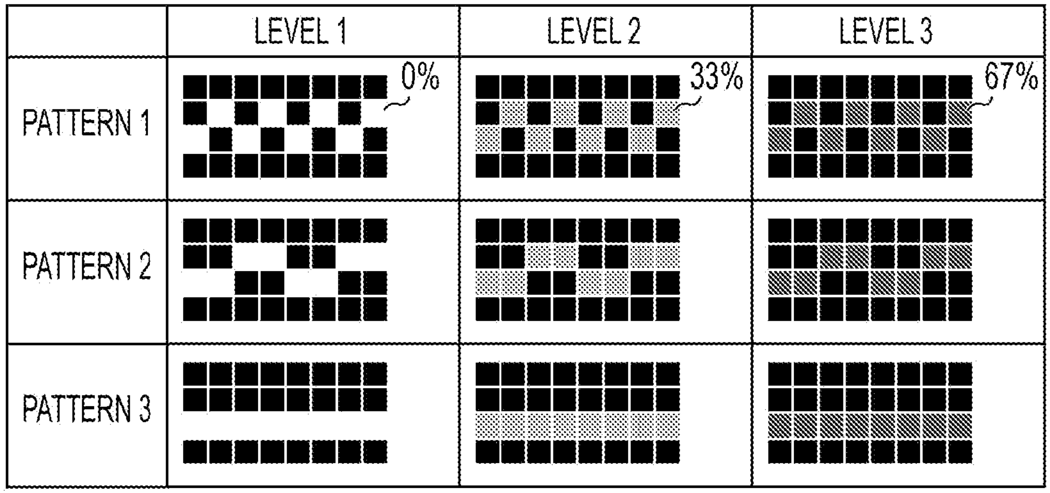
FIG. 10A shows example thinning-out patterns and example additional-dot patterns that are used in the exemplary embodiment.

FIG. 10A shows example relationships between the thinning-out levels and actual thinning-out patterns. According to the above-described method, each of the thinning-out levels is determined, so as to determine the total amount of data thinned out in the sub-scanning direction. In level 1, the total amount of thinned out data is 100% for each of the thinning-out patterns. The total amount of thinned out data is 67% in level 2 and that of thinned out data is 33% in level 3. After the thinning-out level is determined, one of the thinning-out patterns shown in FIG. 10A is selected by using a pull down menu 902. Data on the thinning-out level and the thinning-out pattern that are used by the thinning-out-processing unit 404 can be designated by using the UI shown in FIG. 9.

Figure 10B:
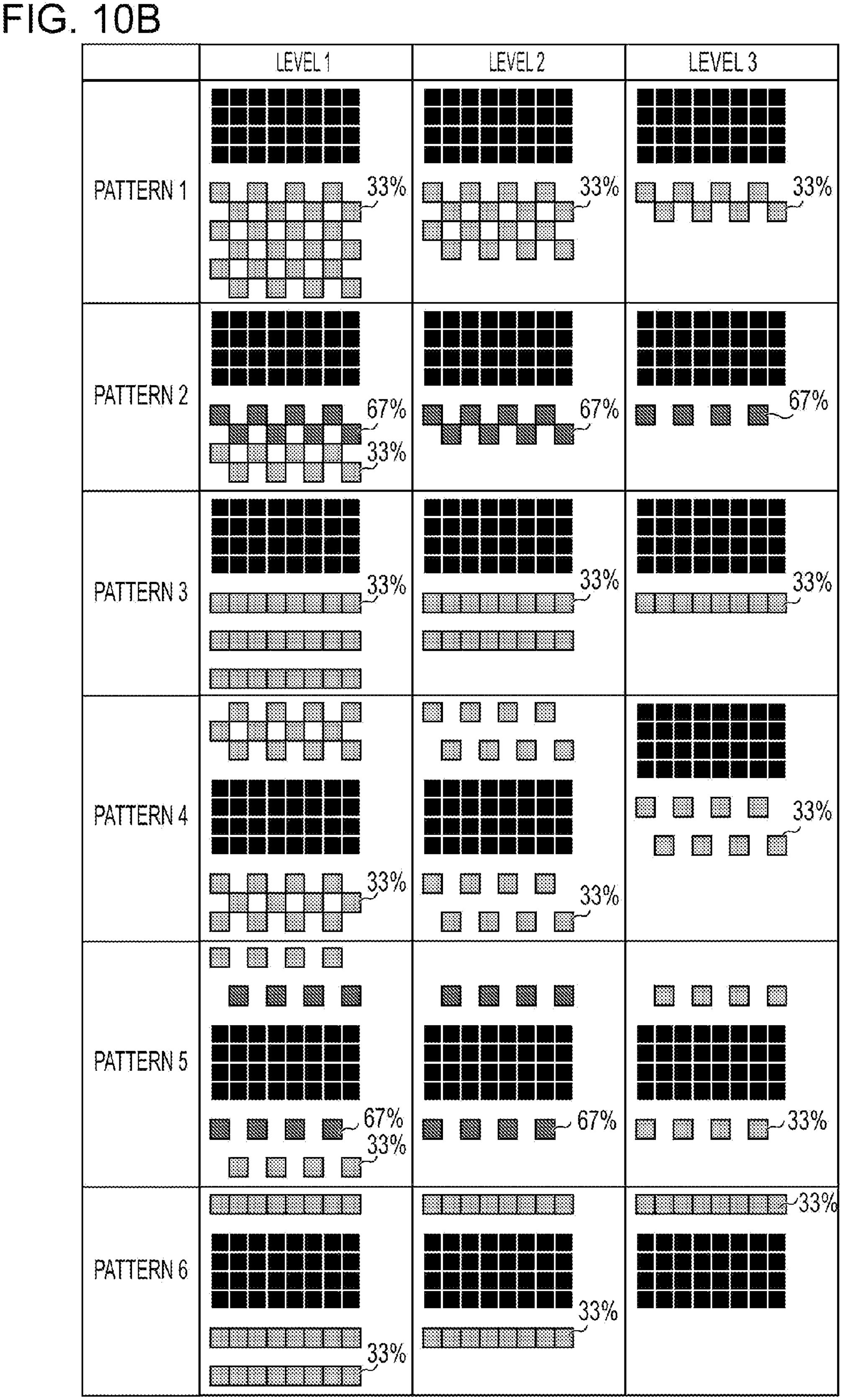
FIGS. 10B and 10C show other examples of thinning-out patterns and other example additional-dot patterns that are used in the exemplary embodiment.

On the other hand, as for the dot addition, dot data of which amount is equivalent to the total of thinned out signals is added to image data for processing so that the density conservation is achieved in a small area. FIG. 10B shows example additional-dot patterns. Since the total amount of data thinned out in the sub-scanning direction is 100% in level 1, data with the 100%-signal level is added, so as to compensate for the thinned out data. However, since 100% may be achieved, as the total amount of data, three 33%-dot-data items may be added in the sub-scanning direction, as indicated by the pattern 1 shown in the column of level 1. Further, to the extent that no latent image is formed, as a dot image, a single 67%-dot data item and a single 33%-dot data item may be added, as indicated by a pattern 2. Dot-data items are arranged in the main-scanning direction in a pattern 3. Being limited only by the conservation of the density in the small area, the dot-data items may be added to not only a rear end, but also a front end, or both the ends. According to patterns 4, 5, and 6, dot-data items are added to front ends and rear ends.

Similarly, the total of signals added in the sub-scanning direction is 67% in level 2 and that of signals added in the sub-scanning direction is 33% in level 3 so that conservation of the density of the signal level is achieved. The use of a pull down menu 903 allows for separately designating data on each of the additional-dot patterns corresponding to the thinning-out levels. Further, only the dot addition may be performed without thinning out the dot data. By merely adding the dot data without performing the dot thinning, the edge effect and the scattered toner can be reduced.

Figure 10C:
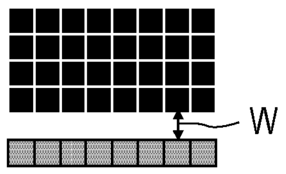

Further, in the present embodiment, an additional-dot-data item is added, so as not to be adjacent to image data subjected to the thinning-out processing. The distance between the additional-dot-data item and the above-described image data may be set, as a parameter. FIG. 10C shows a distance W between an additional-dot-data item and image data and the length of the distance W can be determined through a UI control, such as a slider, 904.

Thus, in the present embodiment, the thinning-out levels are set to perform the thinning-out processing, and the thinning-out pattern and the additional-dot pattern that correspond to each of the thinning-out levels are prepared. Since each of the thinning-out patterns and the additional-dot patterns can be selected separately, it becomes possible to change the thinning-out pattern and the additional-dot pattern that are selected for the use with increased flexibility. Further, it becomes also possible to easily select the additional-dot pattern effective to reduce the tailing phenomenon.

The above-described embodiment allows for selecting the thinning-out pattern and the additional-dot pattern so that a pattern effective to reduce the edge effect and the tailing phenomenon can be selected. Particularly, the above-described embodiment proves that the edge effect and the tailing phenomenon can be reduced with efficiency by adding predetermined pattern data to each of the front end and the rear end of the image data that had been subjected to the thinning-out processing.

In another exemplary embodiment of the present invention, another proposal relating to the additional-dot pattern is made. The system configuration of an image-processing apparatus of the present embodiment is the same as that shown in each of FIGS. 3 and 4 that are described above. Therefore, detailed descriptions of the system configuration are not repeated.

Figure 12:
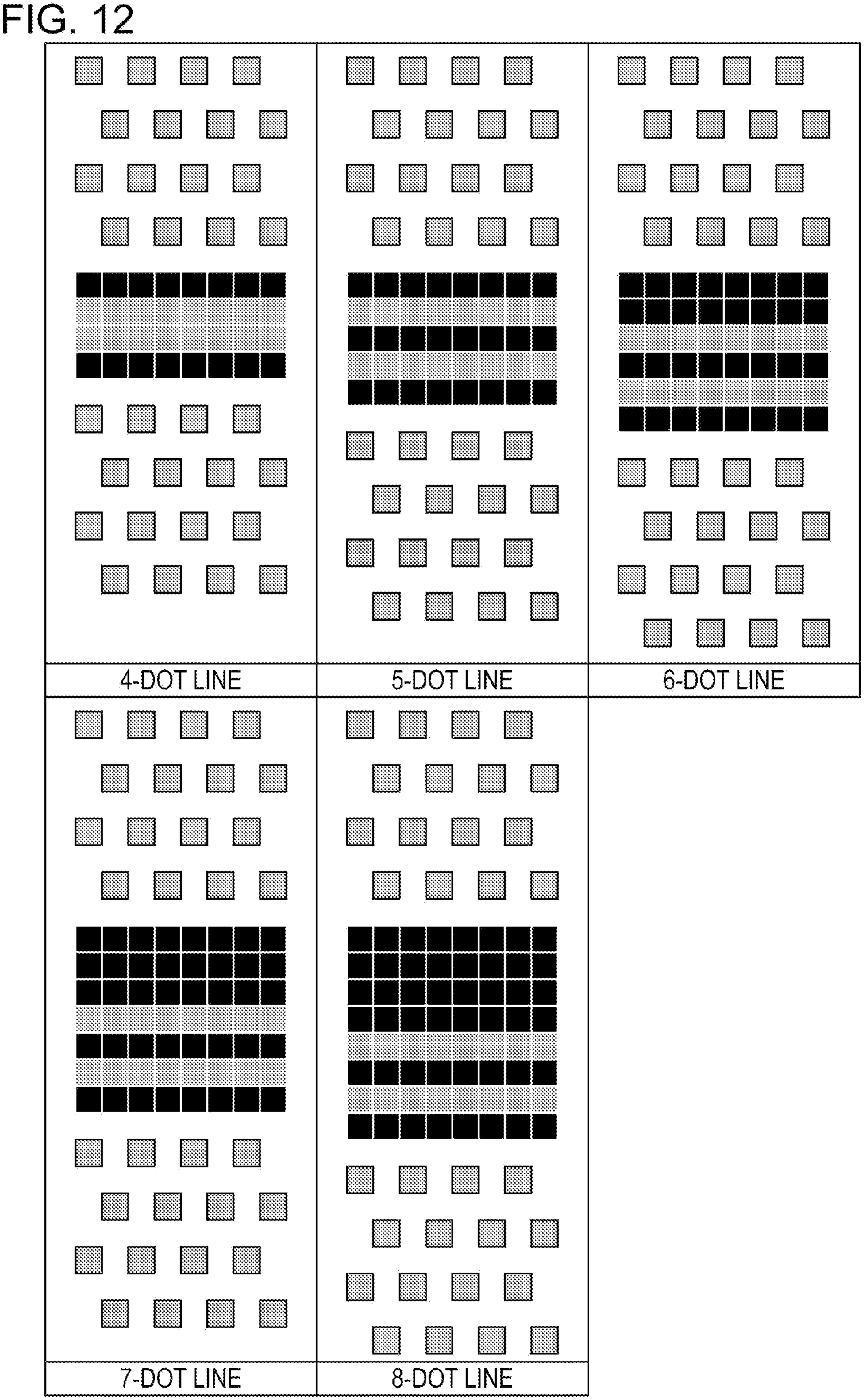
FIG. 12 shows example thinning-out patterns and example additional-dot patterns that are used in the exemplary embodiment.

FIG. 12 shows thinning-out patterns and additional-dot patterns that are used in the present embodiment. Details on each of the thinning-out patterns and the additional-dot patterns, which can be achieved according to each of the above-described embodiments, will be described. In the present embodiment, image data is thinned out through pattern matching, and dot data is added so that the total amount of data thinned out through the thinning-out processing becomes equivalent to the total amount of the additional dot data, as is the case with the above-described embodiments. In the present embodiment, the dot data is added to each of the front end and the rear end. Further, the dot data added to the front end and that added to the rear end are out of phase with each other in the main-scanning direction.

Figure 11:
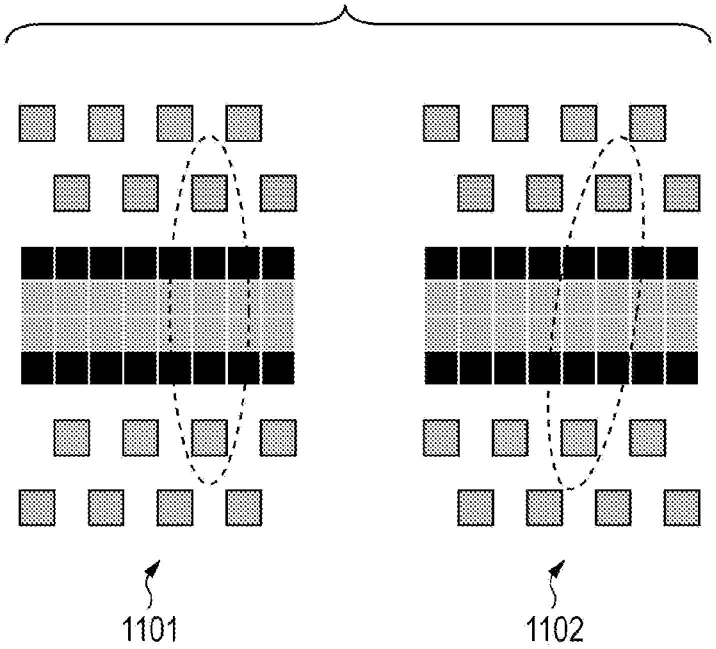
FIG. 11 illustrates the phases of additional-dot patterns used in an exemplary embodiment of the present invention.

Dot-data items that are out of phase with each other will be described with reference to FIG. 11. According to image data 1101, a dot-data item added to the front end and a dot-data item added to the rear end are in phase with each other. According to image data 1102, a dot-data item added to the front end and a dot-data item added to the rear end are out of phase with each other. When the dot-data items are in phase with each other, as is the case with the image data 1101, the position of a part where the pixel density is low, the part being defined at the front end, is opposed to that of another part where the pixel density is low, the part being defined at the rear end. Further, the position of a part where the pixel density is high, the part being defined at the front end, is opposed to that of another part where the pixel density is high, the part being defined at the rear end. Therefore, parts where the height of applied toner is large and parts where the height of applied toner is small are grouped, respectively, due to the edge effect. Consequently, it becomes difficult to sufficiently decrease the height of the applied toner, so as to reduce the tailing phenomenon, in each of the grouped parts where the height of the applied toner is large. Therefore, providing dot data outside image data may not be effective to reduce the tailing phenomenon.

On the other hand, when the dot-data item added to the front end and the dot-data item added to the rear end are out of phase with each other, as is the case with the image data 1102, a part where the density is high, the part being defined at the front end, and another part where the density is high, the part being defined at the rear end, are shifted from each other due to the edge effect. Consequently, parts where the toner height becomes large are not concentrated so that the toner height can be reduced with efficiency. Thus, the present embodiment proves that the tailing phenomenon can be reduced by selecting the above-described patterns without performing the thinning-out processing excessively.

FIG. 12 shows thinning-out patterns and additional-dot patterns that are effective to reduce the tailing phenomenon when image data corresponds to any of a line image with the four-dot width, a line image with the five-dot width, a line image with the six-dot width, a line image with the seven-dot width, and a line image with the eight-dot width. In any of the patterns corresponding to the above-described line images, dot data added to the front end and that added to the rear end are out of phase with each other.

Thus, in the present embodiment, a dot-data item which is so insignificant that no dot image is formed therefor is added to image data that had been subjected to the thinning-out processing at each of the front end and the rear end that are not adjacent to the image data. In that case, the positions where the dot-data items are added are out of phase with each other in the main-scanning direction so that the parts where the toner height becomes large are not concentrated. Consequently, the tailing phenomenon can be reduced with efficiency.

It is to be understood that the object of the present invention can also be achieved by supplying a storage medium (recording medium) storing software (a program) for implementing the functions of the above-described embodiments to a system and/or an apparatus so that a computer (a central-processing unit (CPU) and/or a microprocessing unit (MPU)) of the system and/or the apparatus reads and executes the software. In that case, the software itself, read from the storage medium, achieves the functions of the above-described embodiments, and thus the storage medium storing the software constitutes an embodiment of the present invention.

Further, the above-described functions are not achieved only by executing the software. Namely, the above-described functions can also be achieved by an operating system (OS) or the like running on the computer, where the OS executes part of or the entire actual processing based on instructions of the software. The latter also constitutes another embodiment of the present invention.

In another embodiment of the present invention, the software is written into a memory of a function-expansion card and/or a function-expansion unit connected to the computer so that a CPU or the like of the above-described card and/or the above-described unit executes part of or the entire actual processing based on instructions of the software, in which the above-described functions are achieved.

When using the present invention for the above-described storage medium, the storage medium stores software (a computer program) capable of performing processing procedures that had been described with reference to FIGS. 3 and 4.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-190607 filed on Jul. 23, 2007, which is hereby incorporated by reference herein in its entirety.

What is claimed is:

1. An image-processing apparatus comprising:

a processor comprising:

an extraction unit configured to extract data on an area subjected to thinning-out processing from image data based on a result of a comparison made between the image data and a predetermined image pattern;

a thinning-out unit configured to reduce a signal level at a predetermined ratio for at least one pixel provided in the extracted data on the area subjected to thinning-out processing; and an addition unit configured to add dot data to the image data at a position away from an end of the area subjected to thinning-out processing by a predetermined distance, wherein the addition unit adds the dot data to the image data that are not adjacent to the image data subjected to the thinning-out processing; and a user interface for selecting a thinning-out level from a plurality of thinning-out levels, a thinning-out pattern from a plurality of thinning-out patterns, an additional-dot pattern from a plurality of additional-dot patterns, and selecting a distance between an additional-dot-data item and the image data.

2. The image-processing apparatus according to claim 1, wherein the addition unit adds dot data of which value is equivalent to or less than a development level of a development device configured to develop the image data.

3. The image-processing apparatus according to claim 1, wherein the signal level reduced by the thinning-out unit is equivalent to a signal level of the dot data added by the addition unit.

4. The image-processing apparatus according to claim 1, wherein the thinning-out unit performs the thinning-out processing by changing an amount of light to which the pixel provided in the extracted image area is exposed.

5. The image-processing apparatus according to claim 1, wherein a thinning-out level and/or a thinning-out pattern is designated via the thinning-out unit.

6. The image-processing apparatus according to claim 1, wherein information about controlling the thinning-out processing performed by the thinning-out unit and information about controlling the dot addition performed by the addition unit are retained in association with each other, and wherein a control value is transmitted by selecting a combination of the thinning-out-processing-control information and the dot-addition-control information.

7. The image-processing apparatus according to claim 1, wherein the predetermined image pattern is an area that has a predetermined length in a sub-scanning direction parallel to a direction in which a transfer material is conveyed and that continues in a main-scanning direction perpendicular to the direction in which the transfer material is conveyed.

8. The image-processing apparatus according to claim 1, wherein a distance between a pattern of dot data for addition and/or dot data for addition, and the end of the image area is designated via the addition unit.

9. The image-processing apparatus according to claim 1, wherein when the dot data is added to each of a front end and a rear end of the specific area extracted by the extraction unit, the dot data added to the front end and the dot data added to the rear end are out of phase with each other in the main-scanning direction.

10. An image-processing method comprising:

a processor for extracting data on an area subjected to thinning-out processing from image data based on a result of a comparison made between the image data and a predetermined image pattern;

reducing a signal level at a predetermined ratio for at least one pixel provided in the extracted data on the area subjected to thinning-out processing; and adding dot data to the image data at a position away from an end of the area subjected to the thinning-out processing by a predetermined distance, wherein adding the dot data to the image data that are not adjacent to the image data subjected to the thinning-out processing; and selecting, from a user interface a thinning-out level from a plurality of thinning-out levels, a thinning-out pattern from a plurality of thinning-out patterns, an additional-dot pattern from a plurality of additional-dot patterns, and selecting a distance between an additional-dot-data item and the image data.

11. A non-transitory computer readable storage medium storing a control program making a computer execute an image-processing method used in an image-processing apparatus, the image-processing method comprising:

extracting data on an area subjected to thinning-out processing from image data based on a result of a comparison made between the image data and a predetermined image data;

reducing a signal level at a predetermined ratio for at least one pixel provided in the extracted data on the area subjected to thinning-out processing; and adding dot data to the image data at a position away from an end of the area subjected to the thinning-out processing by a predetermined distance, wherein adding the dot data to the image data that are not adjacent to the image data subjected to the thinning-out processing; and selecting, from a user interface a thinning-out level from a plurality of thinning-out levels, a thinning-out pattern from a plurality of thinning-out patterns, an additional-dot pattern from a plurality of additional-dot patterns, and selecting a distance between an additional-dot-data item and the image data.

* * * * *